W. S. ROCKEY, H. ELDRIDGE & C. D. CLARK.
FURNACE FOR MELTING AND REFINING COPPER.
APPLICATION FILED DEC. 26, 1913.
1,119,540.
Patented Dec. 1, 1914.
2 SHEETS—SHEET 1.
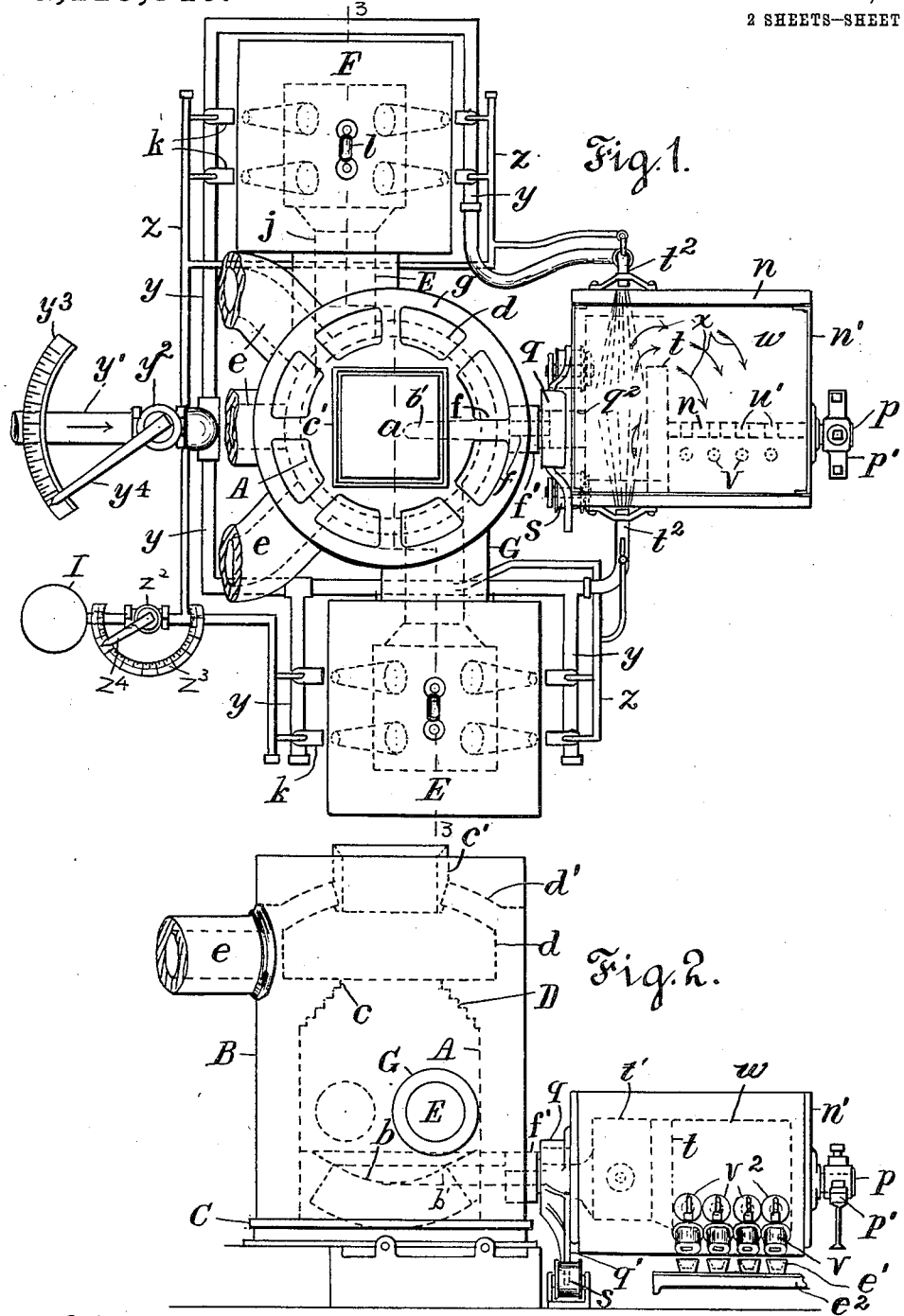

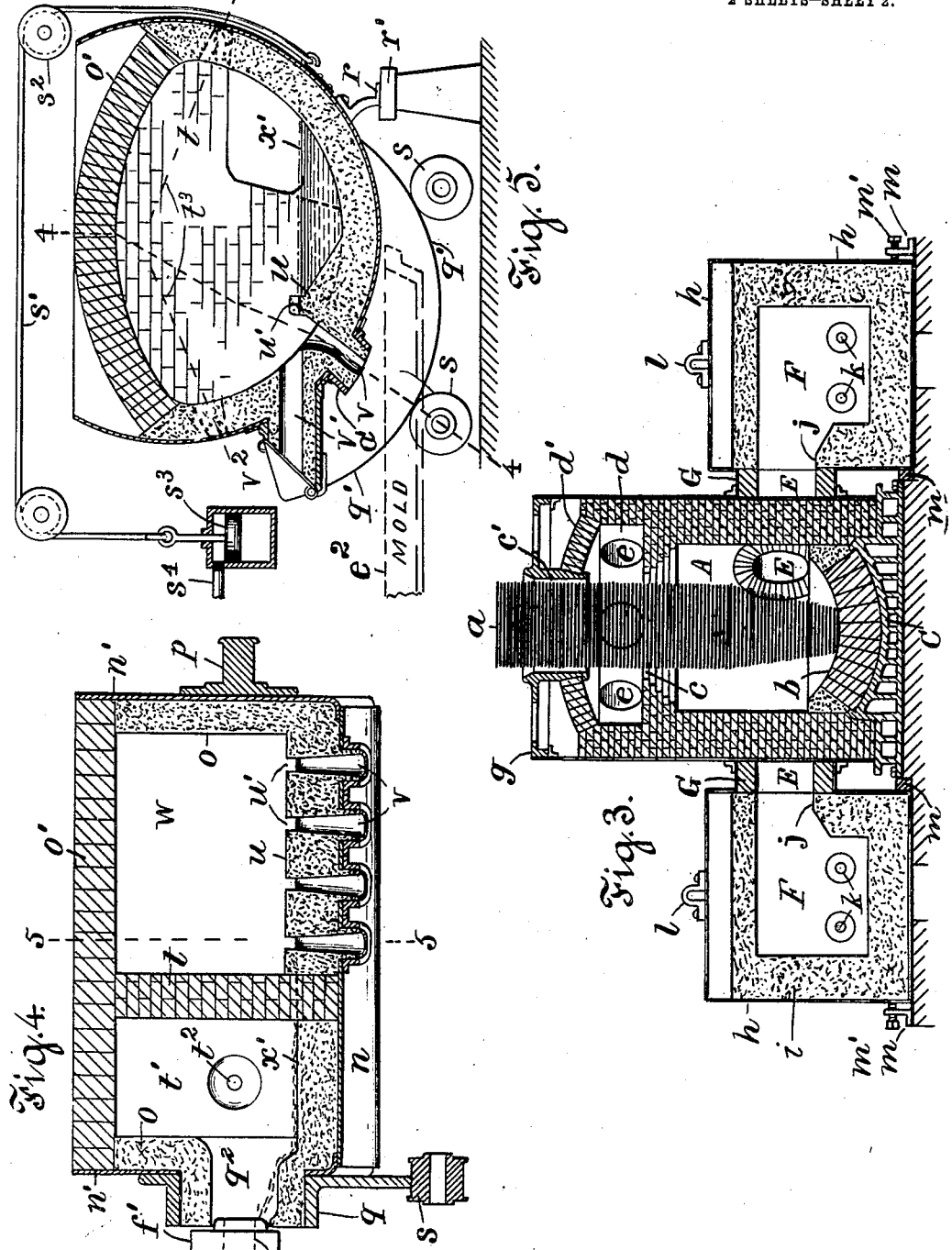

UNITED STATES PATENT OFFICE.

WALTER S. ROCKEY, OF WEST NEW BRIGHTON, HILLIARY ELDRIDGE, OF STAPLETON, AND CARLE DAWES CLARK, OF NEW YORK, N. Y., ASSIGNORS TO METALLURGICAL RESEARCH COMPANY, OF NEW YORK, N. Y., A CORPORATION OF ARIZONA.

FURNACE FOR MELTING AND REFINING COPPER.

1,119,540.  Specification of Letters Patent.  Patented Dec. 1, 1914.

Application filed December 26, 1913. Serial No. 808,706.

*To all whom it may concern:*

Be it known that we, WALTER S. ROCKEY, a citizen of the United States, residing at West New Brighton, county of Richmond, and State of New York, HILLIARY ELDRIDGE, a citizen of the United States, residing at Stapleton, county of Richmond, and State of New York, and CARLE DAWES CLARK, a citizen of the United States, residing at 676 Riverside Drive, New York, county of New York, and State of New York, have invented certain new and useful Improvements in Furnaces for Melting and Refining Copper, fully described and represented in the following specification and the accompanying drawings, forming a part of the same.

This invention relates to furnaces for melting and refining metals, the construction being especially adapted to the refining of electrolytic copper which is exceptionally pure, but is lacking in certain qualities, particularly strength and density, and requires melting to impart these qualities.

The furnace described herein is designed particularly to practise the processes claimed in Patent No. 1,057,882 granted to Walter S. Rockey and Hilliary Eldridge on April 1, 1913, which processes consist essentially in melting and purifying metal in a melting-chamber by bringing it into contact with the controlled products of combustion of hydro-carbon fuel, flowing said metal during and after melting through and out of the melting-chamber simultaneously with and beneath the protective and reducing covering of said highly-heated reducing gases, products of combustion and products of gaseous and vapor decomposition, to cause the said products to act upon the oxids and other impurities contained in the copper, thereby purifying and protecting the melted copper from contamination and oxidation to the point of emergence from the furnace and while discharging to the ladle or mold.

The objects of the invention are chiefly, to provide a simple, practical and efficient apparatus of the type described, from which a continuous discharge of refined product may be obtained; to provide an apparatus which shall be capable of melting or refining the metal rapidly, and also for handling a large quantity of material with a small expenditure of labor; to provide a furnace with separate combustion-chambers in which the products of combustion may be intimately mixed before entering the melting-chamber; to provide means for removing such combustion-chambers when in need of repairs and immediately substituting others, thus maintaining the operation of the furnace continuously; to provide a forehearth which may receive metal from the melting-chamber without exposure to the atmosphere and which may contain an independent combustion-chamber for maintaining a neutral or reducing atmosphere therein, and also a storing-chamber for refining the metal before casting, with means for separating the refined from the partially refined metal during the casting operation; and constructed also to maintain the contact of the reducing or neutral gases with the molten metal as it is discharged into a mold or ladle, and to flow such reducing gases over the surface of the metal in the mold or ladle during the pouring operation, so as to prevent the metal which is rising in the mold from exposure to the atmosphere; also to effect further objects and secure various advantages which will be in part obvious and in part pointed out hereinafter.

As an embodiment of the invention, a suitable apparatus is shown and described for practising the invention, but the invention is not limited to the particular constructions shown in the drawing which show merely a desirable form for a furnace to practise the invention.

The invention will be understood by reference to the annexed drawing, in which—

Figure 1 is a plan of the apparatus: Fig. 2 is a side elevation of the same with the nearer combustion-chamber removed: Fig. 3 is a vertical section on line 3—3 in Fig. 1; Fig. 4 is a cross-section of the forehearth on line 4—4 in Fig. 5; and Fig. 5 is a longitudinal section taken on line 5—5 in Fig. 4.

The construction of the several parts will be described, and then their joint operation.

*Melting-chamber.*—The melting-chamber A is shown with side-walls B resting upon a bed-plate C, which is of concave form in the bottom, and supports the dished floor which sustains the metal. A gutter $b'$ is extended from the bottom of the floor $b$ to a lateral outlet $f$, as shown in Figs. 1 and 2. The construction is adapted for melting slabs of copper $a$ by piling them upon the dished or pot-shaped hearth $b$ up to and through a waste-gas-opening $c$ above such hearth and which opening is formed by a ledge or ring D within the walls B, and is in connection with a flue-chamber $d$ having flues $e$ connected thereto. The top dome $d'$ of the flue-chamber has a feeding-opening corresponding with the waste-gas-opening $c$, and a metal cap $g$ is extended above the dome and is provided with a metal guide-collar $c'$ fitted within the opening of the dome to guide the pile of metal as it moves downwardly when the bottom of the metal column is melted.

The hearth of the melting-chamber is made of hard fire-brick that will not crush readily with the weight of the metal column standing upon it, and it is dished so that the column of metal may re-center itself by sliding downward in case it tends to slip to one side due to unequal melting or settling.

Inlets E for the heating gases are formed through the walls B of the furnace near the level of the hearth at opposite sides of the melting-chamber, and the axes of these inlets are disposed eccentrically or off of a radial line, so as to cause a circling movement of the products of combustion when blown into the melting-chamber. The melting-chamber is made of sufficient size to provide space around the sides of the column of metal to insure the free access of the products from the combustion-chamber, and is made of sufficient height for the pile of copper to absorb a large proportion of the heat. The centers of the inlets E are disposed to discharge toward the edges or corners of the pile of copper upon the hearth, and thus operate upon the metal with the utmost efficiency. A portion of the burning gases blown into the melting-chamber escapes therefrom through the outlet $f$ and the remainder pass upwardly through the margin of the waste-gas-opening $c$ and escape by the flues $e$, the column of metal being thus exposed to the heat all the way to the guide-collar $c'$.

*Combustion-chambers.*—One or more combustion-chambers may be used, and are constructed to secure an intimate mixture of the air and fluid fuel (whether oil or gas) and to conduct the combustion at sufficient distance from the zone of molten metal to insure nearly perfect mixture of the products of combustion before the products of combustion reach said melting-zone. To secure this result, each combustion-chamber is preferably made of a capacity nearly as great as that of the melting-chamber, and is connected therewith by a greatly reduced or contracted passage so that the products of combustion are thoroughly mingled in the combustion-chamber before they pass to the melting-chamber.

Each combustion-chamber F is shown of rectangular plan, and having a metal casing $h$ lined with refractory material $i$ and having the passage $j$ extended from its upper part to connect with a nozzle G projected from the wall B around one of the inlets E.

Fuel-burners $k$ are shown applied to opposite sides of the chamber F near the bottom, so that the flames mingle in the lower part of the chamber and are intimately mixed as they rise to enter the passage $j$. Fig. 3 shows the considerable distance between such burners and the metal to be melted, which secures a nearly perfect combustion of the gases before they operate upon the metal.

The entire combustion-chamber is removable from the nozzle G, and the burners are connected detachably to the casing $h$ of the chamber, to facilitate the removal of the chamber when repairs are required, and the immediate substitution of another combustion-chamber. The removal is effected by attaching the hook of a crane to an eye $l$ upon the top of the combustion-chamber, or putting a sling around the chamber; and the substitution of a similar chamber is facilitated by forming guides $m$ near the foot of the chamber, which permit it to move slightly away from the nozzle G, but guide the passage $j$ into alinement with the inlet E when the chamber is set against the nozzle G. Screws $m'$ are shown to crowd the passage tightly against the nozzle when in proper adjustment, but more effective means would be used in practice. The burners are attached by suitable fastenings to the casing of the substitute combustion-chamber, and the operation of the furnace can therefore be continued with no appreciable interruption.

*Forehearth.*—The forehearth is shown as a horizontally extending vessel formed with a segmental cylindrical shell $n$ having a refractory lining $o$ in the bottom and sides, and an arch $o'$ covering the top and wholly inclosing the space within the forehearth, and is made practically impervious to the air. Heads $n'$ at the opposite ends of the shell are provided respectively with a journal $p$ and with a hollow trunnion $q$ which is fitted to a nozzle $f'$ upon the outlet of the melting-chamber. The trunnion and journal are affixed to the heads $n'$ at one side of and below the center line of the shell $n$, so that the rear part of the forehearth is heavily unbalanced and is sustained by a stop $r$ which rests upon a removable block $r'$. The journal $p$ is supported in a fixed bearing $p'$, and the head $n'$ adjacent to the trunnion is provided with a segmental flange $q'$ concentric with the axis of the trunnion and mounted upon anti-friction rolls $s$ which permits the forehearth to be readily tilted while maintaining connection with the nozzle $f'$.

A wire-rope $s'$ is shown extended from the shell $n$ over pulleys $s^2$ to an actuating piston $s^3$, and the admission of fluid under pressure to the piston through a pipe $s^4$ operates to raise the overbalanced side of the forehearth, and move the opposite side downwardly, to discharge the metal when required, into molds $e'$ upon a mold-wheel $e^2$.

The forehearth provides a combustion-chamber and fuel-burners to keep the molten metal at the right temperature for casting, and also to provide regulated products of combustion to de-oxidize the molten metal before casting, and to protect it from the air while being poured into the mold; and the lips of the spouts which discharge the metal into the molds are arranged so that the products of combustion are confined or retained upon the molten metal in the spouts, and blow also into the molds, thus protecting the metal from air while being poured.

Where a combustion-chamber is required, the space within the forehearth is divided into a combustion-chamber $t'$, and a refining-chamber $w$, by means of a fire-brick partition $t$ extended from one side of the forehearth across the same beyond the center line of the casing; forming a combustion-chamber $t'$ next the trunnion and a refining-chamber $w$ next the journal $p$. Burners $t^2$ in opposite walls of the chamber $t'$ generate any temperature required in the forehearth and produce a gaseous pressure sufficient to drive the gases through the refining-chamber, and out of the vents from that chamber. The combustion is regulated to vary the character of the products of combustion in the forehearth as required. Fig. 1 shows by arrows $x$, the heated gases passing around the edge of the partition $t$ into the refining-chamber $w$, where a pot is formed to store the melted metal. Such pot is formed by raising the floor $x'$ of the combustion chamber, and extending a dam $u$ lengthwise of the floor in the refining chamber, the edge of such dam being preferably beneath the tilting-axis; and a series of spouts $v$ is extended downward adjacent to the dam, to receive the metal from notches $u'$ in the top of the dam corresponding to such spouts. The spouts are not open gutters, but have hoods or covers $a'$ which project over the metal and confine the protective gases to the surface of the metal until delivered. The spouts project so nearly below the tilting axis, that they rise and fall scarcely any in the discharging movement of the forehearth, but remain close to the mold, so that the gases which flow from the forehearth with the metal also flow into the mold and protect the metal rising therein until the mold is filled. The combustion-chamber $t'$ receives partially refined metal from the melting-chamber, and the combustion at the burners is so regulated that the gases in the refining-chamber operate to wholly refine the metal while holding it in such chamber a sufficient time to be purified by the gases over its surface, and escaping by the spouts or the vents $v'$. A portion of the partition is preferably extended across top of the forehearth to form a mixing-chamber, and the burners are directed upwardly, as indicated by the dotted lines $t^3$ in Fig. 5, so that the combustion occurs, and is at first held, in the upper part of the chamber $t'$, and the products of combustion are intimately mixed before they flow downward against the copper, or pass into the refining-chamber. The raised floor $x'$ extends through the partition to the nearer side of the refining-chamber so that metal drops therefrom into the pool therein. The partition operates, with this construction, to separate any unrefined metal on the floor $x'$ from the metal in the pot, when the forehearth is tilted, as the metal in the combustion chamber at such time merely flows forward in such chamber, and cannot mix with the refined metal until the forehearth is turned back to its normal position. In any emergency when the metal is flowing into the forehearth and cannot be poured therefrom, the block $r'$ may be removed from beneath the stop $r$ and the forehearth allowed to tilt backwardly, and the metal thus accumulate behind the dam.

Gas-vents $v'$ are formed through the sides of the forehearth in line with the notches $u'$ in the dam, to permit the cleaning of the notches, and especially to vent the gases from the chamber $w$ during the casting operation. Each gas-vent is provided with a door $v^2$ which may be closed to drive the gases out of the spouts when pouring the metal, and opened at the close of the pouring operation to vent the gases and prevent their continued action upon the metal; thus permitting the metal to chill before the molds are removed.

Four spouts are shown, so that four molds may be filled at once, but the number of spouts depends entirely upon the capacity of the melting-chamber and the nature of the castings desired.

*Regulation of refining gases.*—Air-pipes $y$ connected with an air-main $y'$ are shown extended to the burners upon the combustion-chamber, as also pipes $z$ for fluid-fuel, whether gas or oil, as either may be used for fuel. When oil is used it is desirable that it should be purified by a filter I as indicated diagrammatically in Fig. 1, and it is also preferable in practice that the oil should be fed to the burners from a stand-pipe that overflows constantly to insure uniform pressure.

The air-main $y$ is provided with a regulating-valve $y^2$ and a finely graduated scale $y^3$ is attached to the main, and an index-pointer $y^4$ moves over the index when the valve is adjusted, to indicate accurately the opening of the valve. Such regulators may be applied to any branch of the air-pipes so as to regulate the various burners accurately in the required manner, and thus effect a perfect control over the constitution of the gases, whether neutral or reducing, which are required in the melting-chamber.

The burners upon the forehearth are shown connected with the same main as the burners $k$, but may be supplied with an independent regulator if desired.

A regulating-valve $z^2$ is shown applied to the oil-main from the filter I, and provided with a finely graduated scale $z^3$ and an index pointer $z^4$ which shows the setting of the valve in the desired manner; and similar regulators may be applied to any branch of the fuel-supply-pipe to secure the accurate regulation desired.

*Operation of the apparatus.*—With the apparatus constructed as described, the copper is piled upon the floor $b$ and upward in a column $a$ through the flue-opening $c$ and the feed-guide $c'$ above the flue-chamber $d$, and the combustion is maintained in the combustion-chambers F so as to continuously supply the highly-heated gases to the chamber A and continuously melt the lower part of the metal column $a$. The greater part of the gases escape through the margin of the flue-opening $c$ to the flues $e$, and a small portion passes through the outlet $b'$ into the forehearth, constantly covering and protecting the molten metal which flows from the floor $b$ into the forehearth as rapidly as it is melted. The location of the inlets E near the hearth causes melting of the metal column at the bottom, and the dished form of the hearth constantly centers the column if settling unequally while melting.

The metal-outlet $f$ is shown with a projecting nozzle $f'$ which is adapted to extend within the opening of the hollow trunnion $q$ as shown in Fig. 4, and the lower side of such opening is sloped downwardly to lead the molten metal promptly away from such nozzle to the floor $x'$, from which it gradually flows into the pool in the refining-chamber. The outlet $f$ and nozzle $f'$ are carefully proportioned to not only discharge the metal as it is melted upon the hearth, but also to permit the flow of gases from the melting-chamber with such molten metal; so that its surface is wholly protected from any access of air where the nozzle $f'$ is applied to the trunnion, at which point an absolutely air-tight joint would be impossible. As the metal accumulates in the bottom of the refining-chamber, it is purified by careful adjustment of the burners $t^2$ on the combustion-chamber $t'$ so that the required atmosphere is maintained in the refining-chamber, through which a circulation of gases may be secured by opening the vents $v'$. At suitable intervals, the metal is drawn off through the spouts $v$, and the burners $t^2$ maintain a sufficient gaseous pressure in the refining-chamber to drive the gases from the spouts with the molten metal when the latter is poured, the vent-covers $v^2$ being closed at such time. The hoods $a'$ confine the escaping gases closely to the surface of the metal as it flows from the spouts, and also direct the gases downwardly into the mold which receives the molten metal, so that the surface of the metal in the mold is protected while it is rising and until the casting is completed. The metal is thus refined in its progress through the forehearth, and the molds filled without undue exposure of the metal to oxidation.

It is obvious that the functions of the various parts as described above may be practised by constructions different from those shown in the drawing, and the invention is not therefore limited to the use of any particular number of combustion-chambers, nor to a forehearth divided by a partition to form a combustion-chamber therein, nor to a melting-chamber in which the metal is piled in a column upon the floor upward through a feeding-opening. Such a mode of operation is advantageous, as it permits the continuous feeding of the copper downward into a melting zone without opening the furnace at any point where the atmosphere could gain access and cause oxidation of the molten metal; but it is obvious that the metal can be charged intermittently through the feeding-opening, without extending the column of metal upwardly far enough to seal such opening, the opening being closed in the intervals, and the products of combustion being allowed to escape from such opening during the charging, to prevent access of air.

Copper slabs are shown in the drawing piled in a column upon the floor, but other forms of copper can be melted by inserting through the feeding-opening and properly closing the guide-opening above the same.

A furnace is shown constructed with one feeding-opening to receive one stack of copper slabs, but it is immaterial how many stacks of copper slabs the furnace is arranged to accommodate.

Having thus set forth the nature of the invention what is claimed herein is:

1. A furnace comprising a melting-chamber heated by heated gases, a combustion-chamber wholly separate from the melting-chamber and having fluid fuel burners supplying fluid fuel thereto, a passage for conducting the products of combustion from the combustion-chamber into the melting-chamber, the combustion-chamber having space for the intimate mixing of the products of combustion before discharge to the melting-chamber, and the metal in the melting-chamber being melted wholly by such products of combustion, a tilting forehearth, and a fluid-metal outlet upon the melting-chamber constructed and operated to discharge a current of protective gases with the metal from the melting-chamber into the forehearth.

2. A furnace comprising a melting-chamber heated by heated gases, a combustion-chamber wholly separated from the melting-chamber and having fluid-fuel-burners supplying fluid-fuel and air thereto, with regulated means for producing neutral or reducing-gases in such chamber as desired, the combustion-chamber having space for the intimate mixing of the products of combustion, and a greatly restricted passage connected to the melting-chamber and operating to secure such intimate mixture before delivery, and the metal in the melting-chamber being melted wholly by such mixed products of combustion, a tilting forehearth, and a fluid-metal outlet upon the melting-chamber constructed and operated to discharge a current of protective-gases with the metal from the melting-chamber into the forehearth.

3. A furnace comprising a melting-chamber, a tilting forehearth with means for delivering the molten-metal with a current of protective gases from the melting-chamber into the forehearth, and a downwardly inclined spout upon the forehearth for delivering the molten-metal from a fixed level in the forehearth, such spout being provided with a superposed hood to confine a current of protective gases to the surface of the molten-metal during delivery from the spout.

4. A furnace comprising a melting-chamber, a tilting forehearth, means for delivering the molten metal with a current of protective gases from the melting-chamber into the forehearth, and a combustion-chamber upon the forehearth having fluid fuel-burners connected thereto for maintaining a neutral or reducing atmosphere within the forehearth.

5. A furnace comprising a melting-chamber, a tilting forehearth, means for delivering the molten metal with a current of protective gases from the melting-chamber into the forehearth, spouts upon the forehearth constructed and arranged to deliver a current of protective gases with the molten metal, and a combustion-chamber upon the forehearth having fluid fuel-burners connected thereto and regulated to produce a neutral or reducing atmosphere within the forehearth.

6. A furnace comprising a melting-chamber, a tilting forehearth constructed to effectively exclude air, means for delivering the molten metal with a current of protective gases from the melting-chamber into the forehearth, and one or more gas-vents upon the forehearth to discharge the gas therefrom when required.

7. A furnace comprising a melting-chamber constructed to effectively exclude air, a tilting forehearth constructed to effectively exclude air, means for delivering the molten metal with a current of protective gases from the melting-chamber into the forehearth, spouts upon the forehearth to deliver the molten metal, and gas-vents adjacent to the spouts with covers to close the same during the casting operation.

8. A furnace comprising a melting-chamber, a tilting forehearth, means for delivering the molten metal with a current of protective gases from the melting-chamber into the forehearth, spouts upon the forehearth to deliver the molten metal, gas-vents adjacent to the spouts with covers to close the same during the casting operation, and a combustion-chamber therein having fluid-fuel-burners connected thereto to regulate the gaseous atmosphere within the forehearth.

9. A furnace comprising a melting-chamber, a tilting forehearth, means for delivering the molten metal with a current of protective gases from the melting-chamber into the receiving-end of the forehearth, and means within the bottom of the forehearth operating, when the forehearth is tilted for casting, to separate the molten metal for casting from the molten metal flowing into the forehearth.

10. A furnace comprising a melting-chamber, a tilting forehearth, means for delivering the molten metal with a current of protective gases from the melting-chamber into the receiving-end of the forehearth, a spout upon the forehearth remote from the receiving-end, and a partition within the bottom of the forehearth constructed and operated when the forehearth is tilted for casting, to separate the casting-metal from the metal flowing into the receiving-end.

11. A furnace comprising a melting-chamber, a tilting forehearth, means for delivering the molten metal with a current of protective gases from the melting-chamber into the receiving-end of the forehearth, a spout upon the forehearth remote from the receiving-end, and a partition between the spout and receiving-end forming a combustion-chamber next the receiving-end, and constructed and operating when the forehearth is tilted for casting, to separate the casting-metal from the metal flowing into the receiving-end.

12. A furnace comprising a melting-chamber, a tilting forehearth, means for delivering the molten metal with a current of protective gases from the melting-chamber into the receiving-end of the forehearth, a partition forming a combustion-chamber and refining-chamber therein next to the receiving and discharging-ends of the forehearth, spouts leading from the refining-chamber with means for retaining a current of protective gases upon the metal in the spouts, and one or more vents from the refining-chamber adjacent to the spouts with movable covers for closing the vents and discharging the gases through the spouts during the casting-operation.

13. A furnace comprising a melting-chamber, a tilting forehearth having a hollow trunnion at its receiving-end with means for tilting it upon the axis of the trunnion, spouts upon the forehearth with means for retaining a current of protective gases upon the metal in the spouts, and means for delivering the molten metal with a current of protective gases through the trunnion into the forehearth.

14. A furnace comprising a melting-chamber, a tilting forehearth having a hollow trunnion on its receiving-end, with means for tilting it upon the axis of the trunnion, spouts upon the forehearth with means for retaining a current of protective gases upon the metal in the spouts, means for delivering the molten metal with a current of protective gases through the trunnion into the forehearth, and a combustion-chamber having fluid fuel-burner connected thereto to regulate the gaseous atmosphere within the forehearth.

15. A furnace comprising a melting-chamber, a tilting forehearth, means for delivering the molten metal with a current of protective gases from the melting-chamber into the forehearth, a partition partially dividing the forehearth, forming a combustion-chamber at the receiving-end and a refining-chamber at the delivery-end, and a fluid fuel-burner upon the combustion-chamber, whereby the products of combustion are intermixed and regulated in the combustion-chamber, and operate to refine the metal in the refining-chamber before it is discharged from the forehearth.

16. A furnace comprising a melting-chamber, a tilting forehearth, means for delivering the molten metal with a current of protective gases from the melting-chamber into the forehearth, a partition partially dividing the forehearth and separating the gases at the receiving-end from the gases at the delivery-end, whereby the molten metal may be refined after it has passed the partition, and spouts for discharging the refined metal with a current of protective gases.

17. A furnace comprising a melting-chamber, a tilting forehearth, means for delivering the molten metal with a current of protective gases from the melting-chamber into the forehearth, a partition partially dividing the forehearth into combustion and refining-chambers with one or more burners upon the combustion-chamber, and spouts delivering the metal from the refining-chamber.

18. A furnace comprising a melting-chamber, a tilting forehearth having a hollow trunnion mounted eccentrically upon the receiving-end with means for tilting the forehearth upon the axis of such trunnion, and means for delivering the molten metal with a current of protective gases from the melting-chamber through the trunnion into the said forehearth.

19. A furnace comprising a melting-chamber, a tilting forehearth having a hollow trunnion mounted eccentrically upon the receiving-end with means for tilting the forehearth upon the axis of such trunnion, means for delivering the molten metal with a current of protective gases from the melting-chamber through the trunnion into the said forehearth, and spouts near the delivery-end of the forehearth with means to confine a current of protective gases to the molten metal while flowing through the spouts.

20. A furnace comprising a melting-chamber, a tilting forehearth having a hollow trunnion mounted eccentrically upon the receiving-end with means for tilting the forehearth upon the axis of such trunnion, means for delivering the molten metal with a current of protective gases from the melting-chamber through the trunnion into the said forehearth, spouts near the delivery-end of the forehearth with means to confine a current of protective gases to the molten metal while flowing through the spouts, and a combustion-chamber within the forehearth with a fluid fuel-burner adapted to regulate the gaseous atmosphere therein.

21. A furnace comprising a melting-chamber, a tilting forehearth having a hollow trunnion mounted eccentrically upon the receiving-end, means for delivering the molten metal with a current of protective gases from the melting-chamber into the trunnion, spouts near the delivery-end of the forehearth, and one or more gas-vents with movable covers for closing the vents and discharging the gases through the spouts during the casting operation.

22. A furnace comprising a tight melting-chamber heated by heated-gases, a separate combustion-chamber provided with fluid-fuel-burners and means for producing neutral or reducing-gases in such chamber, the combustion-chamber having space for the intimate mixing of the products of combustion and a restricted passage connected with the melting-chamber, a tight tilting forehearth, means for delivering the molten-metal with a current of the said gases from the melting-chamber into the forehearth, and a series of downwardly inclined spouts upon the forehearth for delivering the molten-metal from a fixed level in the forehearth, and provided each with a superposed hood to confine a current of protective gases to the surface of the molten-metal while flowing through said spouts.

23. A furnace comprising a vertical melting-chamber supplied with heated-gases and having a hearth in the bottom and a feeding-opening in the top through which copper slabs may be piled upon such hearth, a separate combustion-chamber provided with fluid-fuel-burners and operated to mix the products of combustion in such chamber, means for discharging such mixed products of combustion eccentrically into the melting-chamber near the hearth to drive the heated products near the edges of such pile, and an outlet arranged and operated to discharge the molten-metal continuously from the hearth for further treatment, with a current of gases to protect it from the atmosphere in transit.

24. A furnace comprising a melting-chamber heated by heated gases and having a pot-shaped hearth in the bottom and a feeding-opening at the top, through which copper slabs may be piled upon the hearth to such feeding-opening, a combustion-chamber in which highly-heated products of combustion are formed and mixed together, means for discharging them eccentrically into the melting-chamber near the base of the said pile, whereby the pile is self-centered as its base is melted and descends into the pot-shaped hearth, and an outlet for discharging the molten-metal continuously from the said hearth.

25. A furnace comprising a vertical melting-chamber having a pot-shaped hearth in the bottom and adapted to receive a pile of copper slabs, means for discharging the highly-heated products of combustion eccentrically into the melting-chamber to drive them around such pile, and an outlet from the hearth with nozzle constructed and arranged to deliver the metal for further treatment with a current of gases adapted to protect the metal from the atmosphere in transit.

26. A furnace comprising a melting-chamber with venting opening at the top, a hearth at the bottom with an outlet extended therefrom, and a flue-chamber above the venting-opening with a feeding opening in the top of such flue-chamber, one or more flues connected with the flue-chamber, and means for delivering the heated gases of fluid hydro-carbon combustion to such melting-chamber.

27. A furnace comprising a vertical melting-chamber with a pot-shaped hearth having an outlet from its lowest part, and the chamber having a venting opening at the top, an annular flue-chamber adjacent to such venting opening, a feeding opening above such flue-chamber, a flue connected with such flue-chamber, and means for delivering the heated gases of fluid hydro-carbon combustion to such melting-chamber.

28. In a furnace, the combination, with a vertical melting-chamber having a flue chamber in the top, of a hearth in the bottom with an outlet connected thereto, a closed tiltable forehearth having a hollow trunnion connected with such outlet and the body of the forehearth mounted eccentrically upon such trunnion and thus overbalanced on one side, the bottom of the forehearth having a dam at one edge and a spout extended from the outer side of the dam through the underbalanced portion of the forehearth, and means for tipping the forehearth to discharge the melted metal over the dam into the spout.

29. A closed forehearth having a horizontal chamber with a pot for melted metal in one end, means for introducing melted metal into the other end, spouts extended downwardly to deliver the melted metal from the pot, and means for continuously maintaining above the metal in the forehearth a supply of highly heated products of combustion having a controlled and uniform reducing quality at a pressure slightly above that of the atmosphere, whereby the metal is refined while in the forehearth and is protected from any contaminating action of the air or other oxidizing gases while in the forehearth and while passing downwardly to the ends of the discharging spouts.

30. A furnace comprising a melting chamber with a hearth at the bottom, a venting opening at the top and flues at the sides near the top for the escape of the gases, whereby a column of copper slabs to be melted may be piled on said hearth and extended upward into the venting-opening, while permitting the escape of the gases through said flues, a separate combustion-chamber connected with the melting-chamber and provided with fluid fuel burners and operated to mix the products of combustion in such chamber and discharge them into the melting-chamber near the bottom, whereby the hottest gases impinge upon the copper at the bottom of the column, and the gases passing upward to the flues meet and contact with the cooler metal and their heat is thus utilized in great degree.

In testimony whereof we have hereunto set our hands in the presence of two subscribing witnesses.

WALTER S. ROCKEY.
HILLIARY ELDRIDGE.
CARLE DAWES CLARK.

Witnesses:
V. M. COWAN,
GEORGE H. MAKEPEACE.